United States Patent [19]
Schwartzman

[11] 3,869,351
[45] Mar. 4, 1975

[54] EVAPORATION SYSTEM AS FOR THE CONVERSION OF SALT WATER

[76] Inventor: Everett H. Schwartzman, Palos Verdes Estates, Calif.

[22] Filed: Nov. 9, 1973

[21] Appl. No.: 414,600

[52] U.S. Cl................ 202/172, 202/235, 203/11, 203/DIG. 20, 203/26
[51] Int. Cl............................ B01d 3/02, B01d 3/10
[58] Field of Search............ 203/10, 11, 24, 26, 21, 203/22, 25, DIG. 20; 202/234, 192, 194, 195, 173, 174, 235, 172; 159/DIG. 32

[56] References Cited
UNITED STATES PATENTS
3,248,305   4/1966   Williamson ................... 202/195
3,299,649   1/1967   McGrath et al. ............... 202/173
3,300,392   1/1967   Ross et al. .................... 203/11

Primary Examiner—Norman Yudkoff
Assistant Examiner—David Edwards
Attorney, Agent, or Firm—Henry M. Bissell

[57] ABSTRACT

A conversion system is disclosed for evaporating salt water, for example, so as to produce fresh water. A quantity of salt water (liquid phase) is contained to receive heat and thereby evaporate a portion of such water to provide a gaseous phase. Heat is extracted from the gaseous phase resulting in condensed fresh water. The system transfers heat energy to a working fluid to power a compressor structure in a refrigeration cycle, and supplying heat to the liquid phase. Compressor structures are disclosed in the forms of an ejector and a turbine compressor. As disclosed, the same working fluid is employed in the power cycle and the refrigeration cycle. Specific structures are disclosed for obtaining greater efficiency including an arrangement for staging individual systems.

9 Claims, 4 Drawing Figures

EVAPORATION SYSTEM AS FOR THE CONVERSION OF SALT WATER

BACKGROUND AND SUMMARY OF THE INVENTION

A long-recognized social problem (intensified in certain geographic locations) involves the provision of an adequate supply of fresh water. The problem is particularly challenging in areas that are located contiguous to abundant supplies of salt water. That situation has prompted considerable prior effort with the objective of developing an efficient, low-maintenance conversion system that could be relatively inexpensively manufactured. In general, a number of continuous-process evaporation systems have been proposed based upon widely-divergent philosophies of operation. For example, U.S. Pat. No. 3,248,305 (Williamson) discloses an evaporation system that may be analogized to a heat pump wherein heat is continuously transferred from a gaseous phase (of the conversion water) to a liquid phase. Such a prior system was proposed utilizing a motor-driven compressor for the basic cycle and disclosing a jet pump to maintain a vacuum in the conversion tank or vessel. Systems also have been proposed using an ejector as the dynamic element. For example, such a system is disclosed in U.S. Pat. No. 3,288,685 (Kemper et al). Multiple-stage distillation systems also have been proposed, generally with the objective of increasing overall efficiency. Exemplary forms of such structures are shown in U.S. Pat. Nos. 3,299,649 (McGrath et al) and 3,461,460 (McGrath). Systems utilizing turbo-compressor structures have also been proposed as disclosed in U.S. Pat. No. 3,440,147 (Rannenberg).

Although prior systems as exemplified above represent substantial progress in the art, a need continues to exist for further improvements. Perhaps improved efficiency is the most significant consideration. Other important desirable characteristics are the avoidance of compressor seals, small physical size and relatively low operating temperatures. The latter consideration is exceedingly important as it enables elimination of scale, precipitating salts and avoids the need to pre-condition water. The avoidance of compressor seals is also a significant consideration as such tend to be perpetually a maintenance problem. Generally, the present invention represents a substantial improvement with regard to these considerations.

The present invention is directed to a system incorporating a power cycle and a refrigeration cycle. A common working fluid is employed in both cycles. The power cycle actuates a compressor structure which is an active element in the refrigeration cycle. The power cycle also supplies heat to the liquid (salt water) which is to be converted. The refrigeration cycle extracts heat from the vapor (water) or gaseous phase to produce converted liquid (fresh water). The present system permits the use of a high density refrigerant as compared with water vapor compression cycles, to thereby afford improved efficiency and smaller components. Additionally, the system is so implemented that evaporation and condensation are accomplished at fixed temperatures relatively close in range, e.g. small $\Delta$Temp., so as to approach a Carnot cycle with a good efficiency characteristic. Other advantages will be apparent from a detailed consideration of the system as set forth below.

BRIEF DESCRIPTION OF THE DRAWINGS

In the drawings, which constitute a part of this specification, an exemplary embodiment exhibiting various objectives and features hereof is set forth, specifically.

DESCRIPTION OF THE ILLUSTRATIVE EMBODIMENT

As required, detailed illustrative embodiments of the invention are disclosed herein. The embodiments exemplify the invention which may, of course, be constructed in various other forms some of which may be radially different from those disclosed herein. However, the specific structural details as disclosed herein are currently deemed to represent the best forms, within that objective, and furthermore effectively provide a basis for the claims which define the scope of the present invention.

Figure 1:
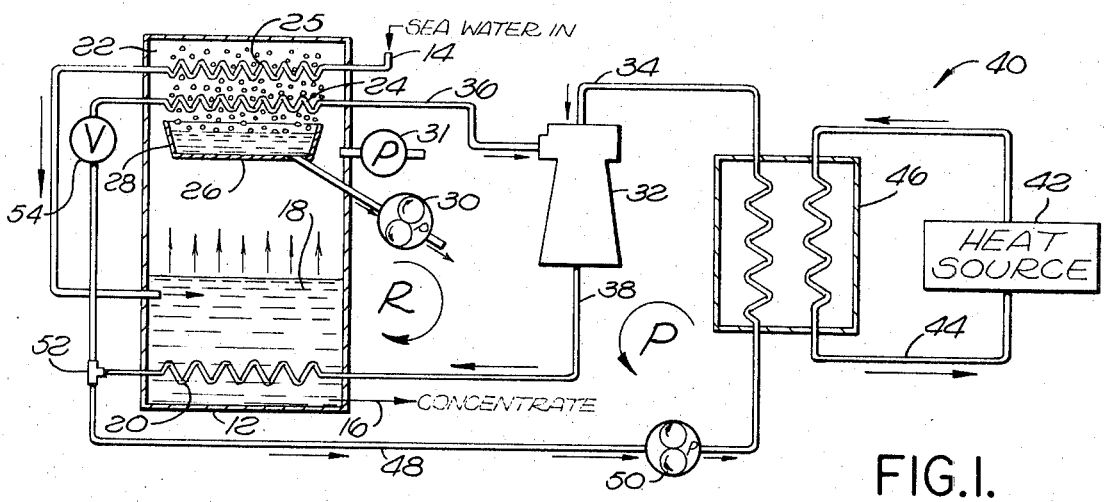
FIG. 1 is a schematic diagram of one system constructed in accordance with the present invention.

Referring initially to FIG. 1, a system is illustrated involving a power cycle or loop P (right) and a refrigeration cycle or loop R (left). As indicated above, common working fluid circulates in the two loops P and R.

Considering the system of FIG. 1 in somewhat greater detail, a pressure vessel or tank 12 (left) passes a stream of seawater, as indicated at an intake duct 14 and an outlet duct 16, maintaining a liquid phase or reservoir 18 of seawater in the tank 12. The reservoir 18 receives heat from a coil 20 to "boil off" vapor for the development of a gaseous phase that is generally designated by the numeral 22. Coils 24 and 25 cool the gaseous phase 22 condensing fluid therefrom as fresh liquid 26 that is received and contained in a basin 28 from which it is drawn out of the tank 12 by a pump 30. Concurrently, a vacuum is maintained by a pump 31 (symbolically represented).

Recapitulating to some extent, the heat provided to the conversion-fluid reservoir 18 from the coil 20 is delivered from the power loop P while the heat drawn from the gaseous phase 22 by the coils 24 and 25 is accomplished by the refrigeration loop R, incoming sea water flowing through coil 25. Functionally, the refrigeration loop R employs a fluid-compression cycle powered by energy from the working fluid in the power loop. That is, a compressor means (in the refrigeration loop R) is driven by the working fluid in the power loop P to accomplish compressed working fluid in the refrigeration loop R.

In the system of FIG. 1, the compression apparatus takes the form of a jet pump or ejector 32, structural forms of which are well known in the prior art and generally involve the utilization of a major stream to accomplish flow in a secondary stream to thereby attain a pressure differential. More specifically, the ejector 32 receives a power stream from the heat exchanger 46 through the line 34 to actuate a stream through the line 36. The two intake streams are merged in a single exhaust stream that is carried in a line 38.

In view of the above somewhat preliminary structural description of the system of FIG. 1, the detailed operation of the system will now be pursued by explaining the heat-flow patterns which are initiated at a heat source structure 40. In the course of further explanation, additional components will be introduced as they are encountered in the explanation.

The structure 40 incorporates a heat source 42 which may comprise any of a variety of heaters, boilers, or sources to provide circulating heat-transfer fluid through a line or duct 44 which includes a heat exchanger 46. Fluid from the heat source 42 yields heat in the heat exchanger 46, which heat is transferred to working fluid in the power loop P. For example, in one operating embodiment, the working fluid in the line 34 is elevated to a temperature of 170° F. As a consequence, the working fluid's energy content is so increased as to substantially and forcefully pass through the ejector 32 from the line 34. The heated working fluid then passes to the coil 20, supplying a substantial quantity of heat to the liquid reservoir 18. The working fluid from the coil 20 then flows to the heat exchanger 46 through a line 48 maintained at a high pressure by a pump 50. Thus, the power loop P involves the transfer of heat from the heat source structure 40 to the fluid reservoir 18, and the actuation of the ejector 32 to produce flow (into the ejector 32) from the line 36.

The system of FIG. 1 involves common points between the power loop P and the refrigeration loop R at which the characteristics of the working fluid must be balanced to some extent. For example, from a junction 52, the working fluid (lower left) flows through an expansion or JT valve 54 as well as the pump 50. From the valve 54, a coil 24 receives the working fluid for operation as in a typical compression-refrigeration system. That is, heat is extracted from the gaseous phase 22 in the tank 12, condensing the fresh liquid (water) from the gaseous phase 22, which accumulates as the liquid 26 to be drawn from the tank 12 by the pump 30. The working fluid entering the coil 24 from the JT valve 54 (where its temperature is reduced to condense the vapor 22) is primarily liquid. Of course, as heat is received by the working fluid in the coil 24, from the vapor 22, the working fluid is vaporized while the vapor 22 is condensed. Accordingly, substantial quantities of heat are transferred due to the heat of vaporization of the working fluid. Also, as the gaseous working fluid enters heating coil 20 it is condensed to a liquid while in turn the working fluid is boiling, the water thus exchanging very large quantities of heat through the change of state occurring in the two fluids and by reason of the high latent heat of vaporization. Thus, fresh water is produced efficiently from raw water which is either brackish, salty, impure or otherwise undesirable.

In the operation of the system, it is noteworthy that the pump 30 draws fresh water from the tank 12 which is under a reduced pressure (vacuum) and expels it at the desired pressure level (above ambient). The pump 31 maintains a reduced pressure inside the tank. In both aspects the volumes involved are rather small with the result that the pumps 30 and 31 may be relatively small. Somewhat similarly, the pump 50 may also take the form of a small unit as the working fluid is in a liquid state when it is acted upon by the pump 50.

Generally, the system of FIG. 1 is relatively inexpensive to construct and in spite of that consideration may be designed to attain a reasonably high level of efficiency. However, in some situations, it may be desirable to employ a more elaborate system in the interest of substantially-increased efficiency. Such a system is shown in FIG. 2 and will now be considered in detail.

Figure 2:
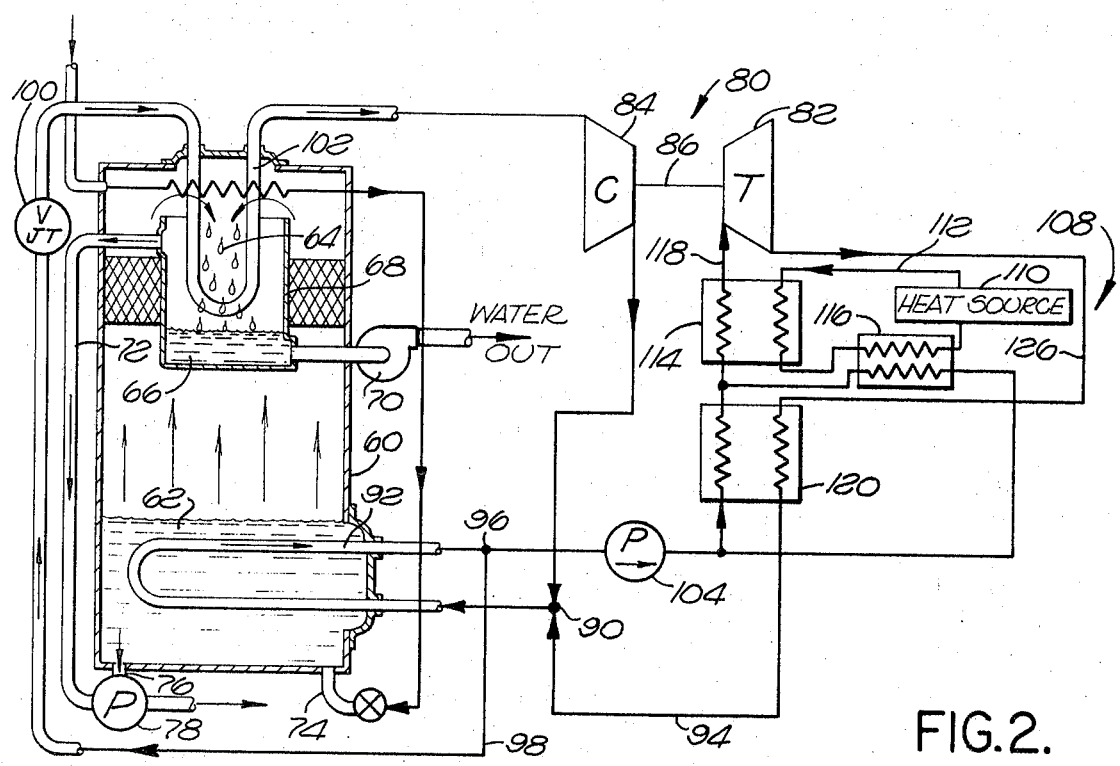
FIG. 2 is a schematic diagram of another system constructed in accordance with the present invention.

Generally, a tank 60 is illustrated in FIG. 2 in somewhat greater detail than as shown in FIG. 1, and contains a liquid phase 62 and a gaseous phase 64. The gaseous phase 64, as illustrated, is condensed to provide a quantity 66 of fresh water in a basin 68 from which such water is removed by a pump 70. Gas is also drawn from inside the basin 68 through a line 72 (upper left) to preserve a vacuum within the tank 60 upon the release of air that is liberated from the water being processed. The reservoir or liquid phase 62 is maintained as a stream enters the liquid phase 62 through a line 74 and an exhaust stream passes through a line 76, drawn by a pump 78. The continuous circulation of water through the liquid phase 62 reduces scalar deposits by avoiding high levels of salt concentration.

Generally, the operating philosophy of the system of FIG. 2 is somewhat similar to that of FIG. 1. The major distinction between the two systems is that the system of FIG. 2 employs a turbo-compressor unit 80 (upper right) which is driven by the power loop to provide the compressor function for the refrigeration loop. Specifically, the turbo-compressor 80 includes a turbine 82, mechanically coupled to a compressor 84. The turbine 82 and the compressor 84 may be carried on a common shaft 86, supported on gas bearings as well known in the prior art for efficient operation.

The compressor 84 provides working fluid at an elevated pressure in an exhaust 88 which is connected through a junction 90 to a coil 92 that is positioned within the liquid phase 62 contained in the tank 60. Recognizing the values as being purely exemplary, in one illustrative embodiment, the working fluid in the system is a fluorinated compound refrigerant and in the line 88 has a temperature of 81° and a pressure of 33 pounds per square inch. It is noteworthy that other refrigerants may well be employed, e.g., $NH_3$ and $SO_2$ as well as methylchloride. The temperature of the working fluid received at the junction 90 from the other input 94 is at a somewhat higher temperature, e.g., over 100°, with the result that the combined working fluid entering the coil 92 might approximate 85° F at a pressure of 33 PSIA. Generally, operating the system with the liquid phase 62, a temperature below 140° F produces relatively little scale deposit within the tank 60. It is to be noted that in the exemplary system the temperature may be substantially below that level.

After passing through the heating coil 92, the working fluid flows to a junction 96 from which flow is through a line 98 to an expansion valve 100 and then to the cooling coil 102. As an alternate path, flow from the junction 96 is through a pump 104 to the heat source system 108. Various heat exchangers are provided in the heat source system 108 to improve the efficiency of the system; however, the basic heat input is from the heat source 110 which provides elevated-temperature fluid circulating in a line 112 through a primary heat exchanger 114 and a secondary heat exchanger 116. The primary heat-transfer path into the working fluid carried by a line 118 to drive the turbine 82 is in the heat exchanger 114. Supplemental heat paths involve the heat exchanger 116 and still another heat exchanger 120.

Essentially, the function of the heat exchangers 114, 116 and 120 is to effectively provide heat to the working fluid entering the turbine 82 through the line 118. As indicated, the major source of heat is directly from the heat source 110 which, as indicated above, may take the form of any of a wide variety of forms, such as electric heaters, boilers, heat exchangers and so on. In fact the heat source may provide heat-transfer liquid at a temperature which is relatively low in relation to conventional boilers. For example, in one embodiment, the heat source 110 may provide heat-transfer fluid to the heat exchanger 114 at a temperature of approximately 120° F, the liquid then returning to the heat source through the heat exchanger 116 to drop from a temperature of about 80° to a temperature a few degrees below 80°.

As a further consideration in relation to heating the working fluid, the exhaust from the turbine 82, which is carried in a line 126, passes through the heat exchanger 120 along with the working fluid from the pump 104. As a result, heat is extracted from the exhaust working fluid to pre-heat the working fluid en route to the turbine 82. In view of these considerations, an effective heat source system 108 is provided with a view toward substantially-improved efficiency.

As indicated, the general operation of the system of FIG. 2 is somewhat similar to that of FIG. 1. Specifically, a stream of raw water, e.g., salt water, is provided through the line 74 to maintain the reservoir or liquid phase 62. Water is drawn from the liquid phase 62 (along with a small quantity of gas) by the pump 78 so as to maintain a vacuum and avoid high concentrations of salt, for example, in the liquid phase 62.

As suggested above, fluid from the liquid phase 62 is evaporated to provide the gaseous phase 64 from which fluid is condensed by the cooling action of the coil 102. In that manner, fresh-water condensate is provided in the basin 68 for withdrawal from the tank 60 by the pump 70.

Similar to the operation described above, the working fluid leaving the coil 102 is compressed for example by the compressor 84 to a pressure of 33 PSIA at a temperature of 81° F. The resulting fluid stream (in the line 88) merges with the exhaust stream from the turbine 82 at the junction 90 to provide working fluid at a higher temperature, however, at substantially the same pressure. The elevated-temperature fluid then passes through the coil 92, providing heat to the liquid phase 62. The working fluid leaves the coil 92 at a reduced temperature, e.g., 75°. A portion of that fluid is supplied to the turbine 82 through the pump 104 after being elevated in temperature by the heat source system 108. Another portion of the fluid is transferred through the line 98 and the valve 100 to the cooling coil 102. It may, therefore, be seen that the heating coil 92 may be operated at a temperature range of 85° F while the cooling coil is operated at a temperature of approximately 75° F. As a consequence, the transitional or mean temperature within the tank 60 may approximate 80° F.

Figure 3:
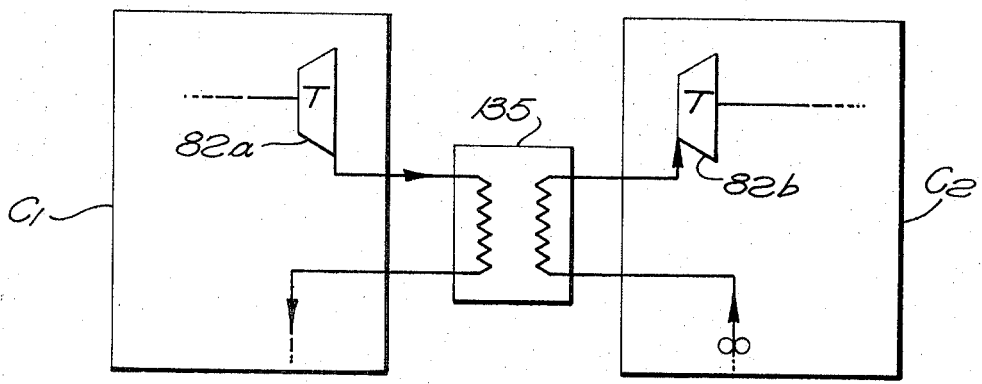
FIG. 3 is a schematic block diagram of a composite system constructed in accordance with the present invention.

In general, such a system operating at such a temperature range is capable of relatively-high efficiencies, e.g. approaching the conversion of 80 gallons of water per pound of hydrocarbon fuel consumed in the heat source and in a boiler 110. To obtain more efficient operating levels, the system of the present invention may be incorporated in a multiple-stage apparatus. Specifically, referring to FIG. 3, two conversion systems C1 and C2 as disclosed above are represented. Specifically, the two systems may take a form identical to that disclosed in FIG. 2 and in that regard the turbine 82a is indicated in the system of C1 while the turbine 82b is indicated in the system of C2. Working fluid exhausing from the turbine 82a passes through a heat exchanger 135 and returns to the system C1. As a consequence, heat is transferred to a working fluid in the system C2 for driving the turbine 82b. Such staged operation allows increased efficiency by establishing different conditions for each of the systems C1 and C2. For example, the heat source for the system C1 may be at a temperature of 500° F while the heat source for the system C2 (exhaust working fluid from the turbine 82a) may be at a temperature of 300° F. As a consequence, working fluid may be driven to lower temperatures in the combined cycles so as to obtain a substantial increase in efficiency.

Figure 4:
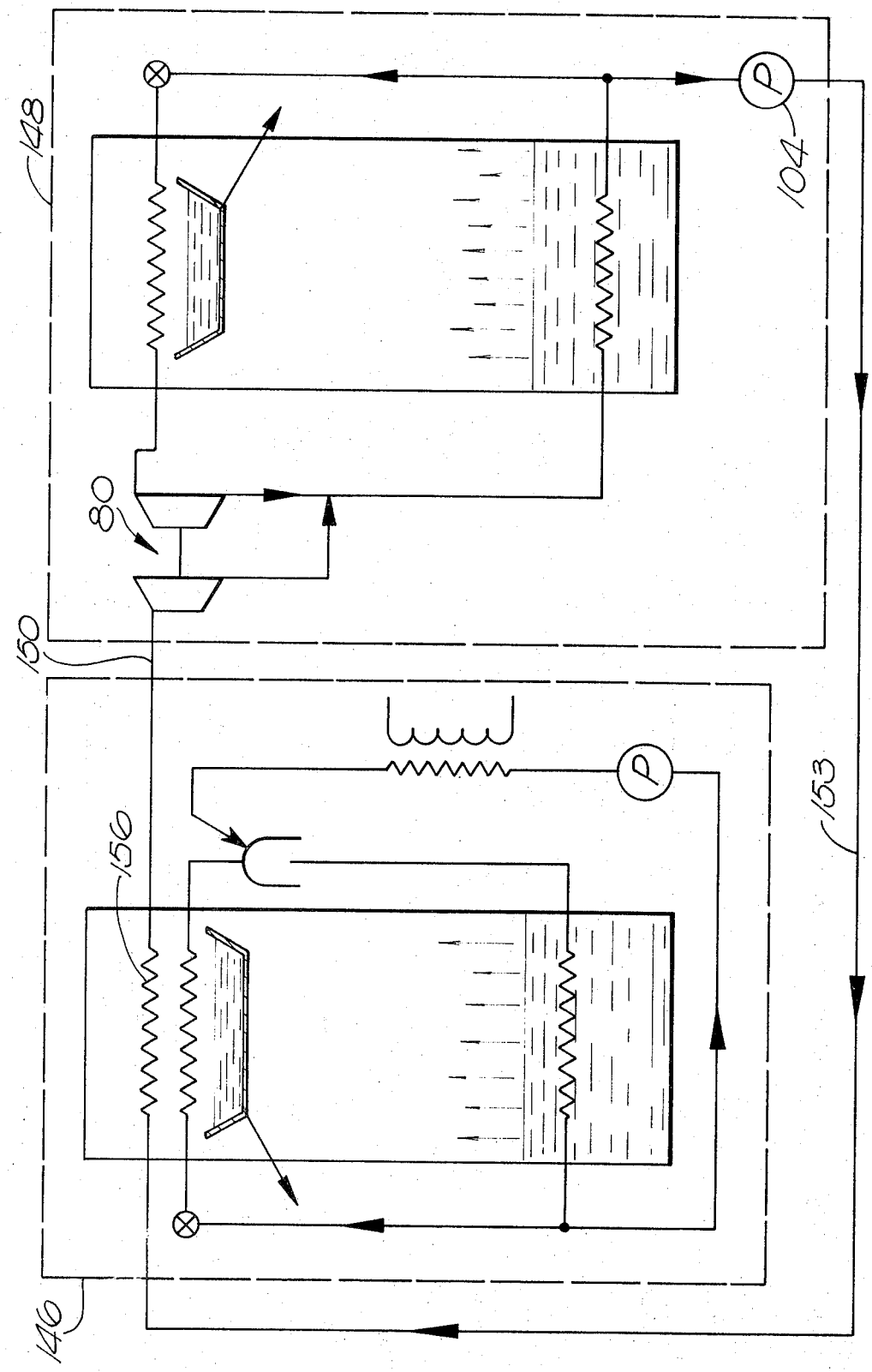
FIG. 4 is a schematic diagram of another composite system constructed in accordance with the present invention.

As still another alternative, a composite ejector-turbocompressor system offers certain distinct advantages. Specifically, as illustrated in FIG. 4, an ejector unit 146 (operating as described with reference to FIG. 1) is operatively connected with a turbo-compressor unit 148 (operating as described with reference to FIG. 2). In operation, the ejector unit 146 operates as a first stage with the excess heat therefrom being carried by working fluid through a line 150 to drive the turbocompressor unit 80 of the second stage or unit 148. Of course, the second stage or unit 148 operates at a lower temperature (higher vacuum) than the first stage or unit 146. The system loop is closed by a line 153 from the pump to the coil 156.

Of course, various other modifications and changes in the systems as disclosed herein will be readily apparent to those skilled in the art. As a consequence, the scope hereof shall be deemed to be in accordance with the claims as set forth below.

I claim:

1. An evaporation system, as for the conversion of salt water by heat energy, comprising:
    means for containing fluid to undergo conversion in a liquid phase and a gaseous phase and including means for removing condensed liquid from said gaseous phase;
    first working-fluid means in heat-transfer relationship with said liquid phase;
    second working-fluid means in heat-transfer relationship with said gaseous phase;
    heat source means for transferring said heat energy to said working fluid to provide high-temperature working fluid;
    compressor means connected to be activated by said high-temperature working fluid to provide pressurized working fluid;
    means for supplying said pressurized working fluid through said first working fluid means, then through said second working-fluid means to said compressor means;
    means for supplying working fluid from said first working-fluid means to said boiler means;
    means for securing a temperature difference between said first working fluid and said second working fluid;
    means for obtaining and maintaining said contained fluid under vacuum.

2. An evaporation system according to claim 1 wherein said means for containing comprises a tank housing both said first working-fluid means and said second working-fluid means.

3. An evaporation system according to claim 1 wherein said compressor means comprises an ejector.

4. An evaporation system according to claim 1 wherein said compressor means comprises a turbine connected to be driven by said high-temperature working fluid, and a compressor connected to be driven by said turbine to provide said pressurized working fluid from working fluid received from said second working-fluid means.

5. An evaporation system according to claim 1 further including means to circulate fluid to undergo conversion through said liquid phase of said means for containing.

6. An evaporation system according to claim 5 wherein said means for containing comprises a tank housing both said first working-fluid means and said second working-fluid means.

7. An evaporation system according to claim 1 further including heat exchanger means for transferring heat from spent working fluid from said compressor means to working fluid supplied to said heat source means.

8. An evaporation complex comprising a plurality of evaporation systems as defined by claim 1 and further including heat-transfer means for transferring heat from said working fluid exiting from said compressor means in one of said systems to working fluid in place of said heat source means of another of said systems.

9. An evaporation system according to claim 1 wherein said means for containing comprises a tank housing both said first working-fluid means and said second working-fluid means and wherein said compressor means comprises a turbine connected to be driven by said high-temperature working fluid, and a compressor connected to be driven by said turbine to provide said pressurized working fluid from working fluid received from said second working-fluid means.

* * * * *